Nov. 15, 1966  J. F. TAVERNELLI ETAL  3,285,593
FURNACE HEAT SHIELD
Filed Sept. 4, 1964
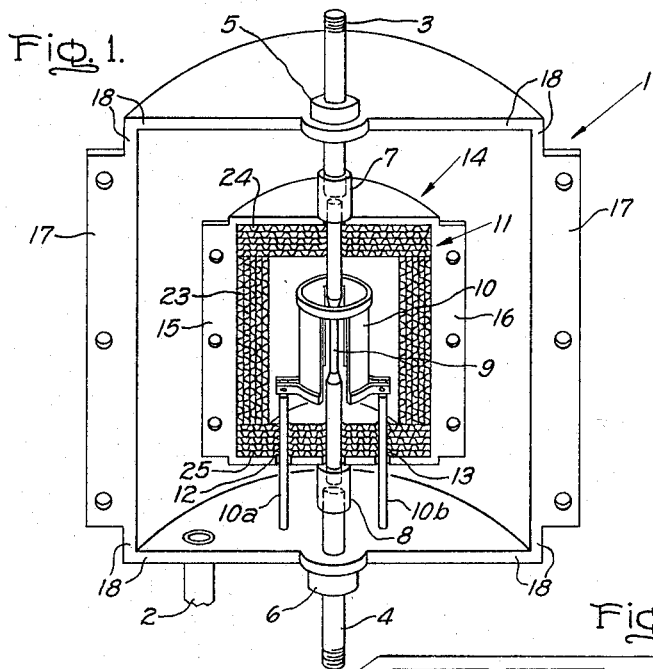
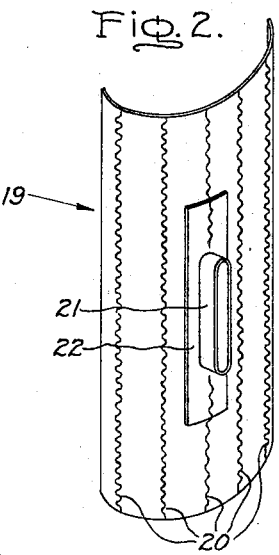
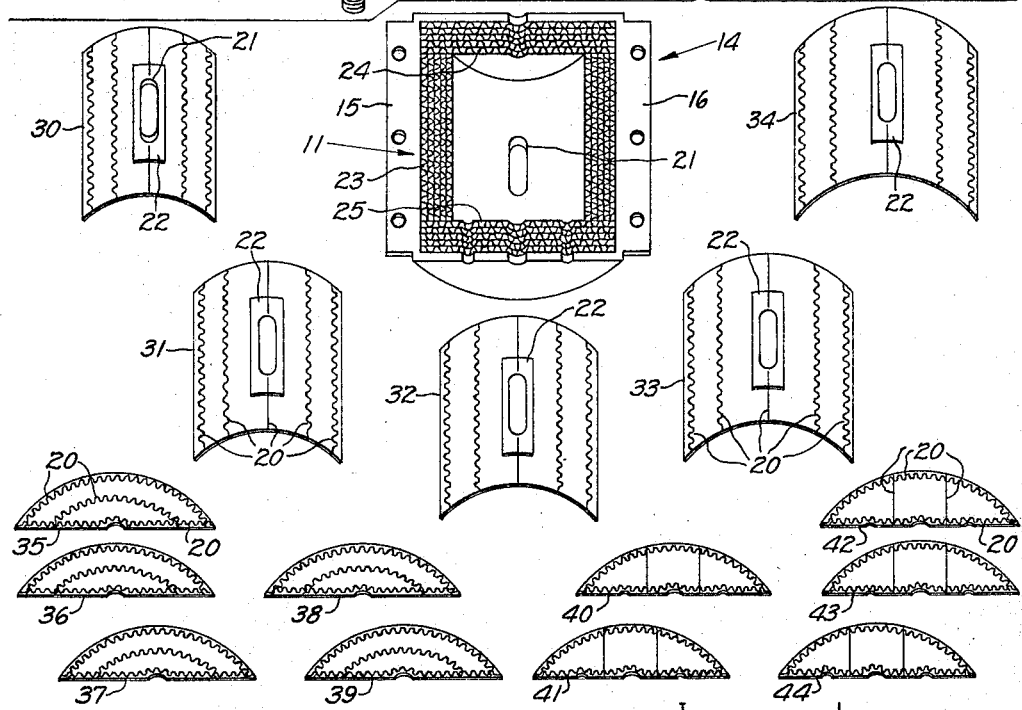
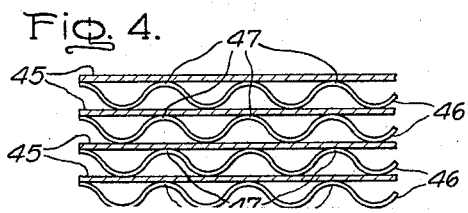
Inventors:
Joseph F. Tavernelli
Richard A. Piepsny
by Henry P. Truesdell
Their Attorney United States Patent Office 3,285,593
Patented Nov. 15, 1966

3,285,593
FURNACE HEAT SHIELD
Joseph F. Tavernelli, Euclid, and Richard A. Piepsny, Willoughby, Ohio, assignors to General Electric Company, a corporation of New York
Filed Sept. 4, 1964, Ser. No. 394,434
3 Claims. (Cl. 263—50)

This invention relates to multi-layered heat shielding for high temperature furnaces of a vacuum or non-oxidizing atmosphere type, and more particularly to a type of construction of such heat shields that holds the layers apart one from another.

In current vacuum and non-oxidizing atmosphere types of high temperature furnaces it is generally necessary to provide a means for preventing excessive losses of heat from the hot zone into the outer casing of the furnace. Ceramic refractories often cannot be used for such shielding because of their tendencies to adsorb gases and impurities which are later released to and contaminate the vacuum or atmosphere. Highly efficient shielding against heat losses by thermal radiation have been provided in such furnaces in the form of multi-layered, highly reflective metal heat shielding. Such heat shielding substantially encloses the hot zone of the furnace so that outwardly directed thermal radiation coming from the hot zone is reflected directly back into the hot zone by the innermost member of the heat shield, and so that outwardly successive members of the heat shield reflect back towards the hot zone thermal radiation coming from the next innermost layer of the heat shield. With this type of multi-layered heat shielding, although the innermost layer of the shield reflects a large portion of the thermal energy coming from the hot zone back into the hot zone, it itself is heated by the absorption of some of the radiant thermal energy. Thus, the innermost member effectively becomes a new heat source at a lower temperature than the hot zone but also radiating outwardly thermal energy that would be lost from the system if it were not for the successive layers of the heat shield. After coming to equilibrium, each layer of the heat shield will be at a lower temperature than the next inner layer.

The efficiency of such heat shielding largely depends on three factors: first, the proportion of thermal energy reflected from the surface of each layer in relation to the amount of the energy absorbed by the layer of the heat shield; second, the number of layers in the shield; and third, the amount of heat lost from the system other than by attenuated radiation through the heat shield including conduction, convection in an atmosphere furnace, and radiation out through line-of-sight openings in the heat shield assembly. Conduction through the heat shield can be a serious source of heat losses.

It is desirable to minimize heat losses from the hot zones of these furnaces wherever possible. Not only do heat losses make necessary the use of greater amounts of power to maintain a certain temperature in the hot zone, but also it can become impossible to attain temperatures above certain limits if the heat losses are too high.

Especially in the very high temperature furnaces that require refractory metals for at least part of the heat shield, but also for lower temperature furnaces that can use other metals for heat shielding, replacement of the heat shield assemblies can be quite expensive. In some such furnaces, severe buckling and warping stresses can be caused in the heat shield by the location, shape and heat capacity of the material being heated, uneven heating or cooling of the material, and other factors. Other types of failure of the heat shields such as by corrosion or severe contamination and warpage can be caused by gases or other contaminants given off by the material being heated. Heat shields of the prior art have generally been constructed in such a manner as to make it necessary to replace the entire heat shield assembly, or at least to dismantle the entire assembly and to replace major parts of it upon the failure of any part, particularly the failure of the innermost layer which is most susceptible to damage. Also, in heat shields having the individual layers rigidly fixed one to another, even at only a few points, severe and damaging thermal stresses can be set up between the members. Likewise, prior heat shield constructions were often susceptible to localized losses of efficiency due to warpage causing members to contact one another and even welding together, thereby effectively "shorting out" layers of the shield in terms of thermal conductivity. Whole-cylinder heat shields having tabular or loose wire spacers at infrequent intervals around the perimeters of the shield members mainly for the purpose of maintainining concentricity of the members are readily rendered less efficient by such warpage.

Accordingly, it is an object of the present invention to provide heat shield assemblies and members therefor which constitute improvements over the prior art in the minimization of conductive heat transfer through the heat shield assembly and in which individual members of the assembly are readily replaceable without dismantling the entire assembly.

It is a further object of the invention to provide such heat shields in which individual members can expand or contract independently of each other, thus largely avoiding damaging thermal stresses and resultant warpage.

Also, it is an object of the invention to provide a heat shield construction resistant to thermally conductive contacting of members one to another caused by warpage or other types of displacement.

Another object of the invention is to provide such heat shield assemblies which are more economical to manufacture initially and which can be readily repaired by the replacement of single members when individual members fail.

FIG. 1 is a schematic view of a vacuum furnace opened to show a heat shield of the invention in position for the heating and tensile testing of a standard tensile specimen.

FIG. 2 is a pictorial view of a member of a heat shield of the invention having a flange adapted to hold together better a multi-layered heat shield assembly.

FIG. 3 is a composite view showing a heat shield of the invention with one half assembled and the other half disassembled and laid out for ease of observation.

FIG. 4 is a schematic view of a few layers of a heat shield of the invention in section.

Briefly stated, the present invention in one form comprises a thermal radiation reflecting metallic multi-layered heat shield assembly for use in high temperature vacuum or non-oxidizing atmosphere furnaces. The heat shield assembly comprises a plurality of layers or members designed to surround a hot zone of a furnace for the purpose of reflecting thermal radiation back into the hot zone, both directly from the innermost member, and indirectly by the outer members of the heat shield. Some of the members of the heat shield may be keyed together by a flange extending through the several layers or members. The essence of the invention, however, lies in the provision of corrugated, crimped, undulating, scalloped or other type of wire having raised portions as described in this specification (herein referred to as undulating) affixed, such as by welding, to the surfaces of at least some of the members to provide effective separation of the members, thus avoiding or minimizing conductive heat transfer between the members. Although normal round wire is generally preferable, ribbon might be slit from flat sheet to a narrow enough width to be equivalent to wire in these applications. The wire spacers may be provided in the form of loosely open-wound helices with a small diameter and a large pitch, the helices being spot-welded to the members. The wires and their raised portions are spaced about the surfaces of the members with sufficient periodicity to prevent warpage or other displacement from causing thermally conductive contact between members. Since it is not necessary to have these wire spacers on the inside of the innermost member, they can be provided preferably on the outer surfaces of each member of the heat shield. In one preferred embodiment of the invention, the heat shield assembly can take the form of a cylinder with both ends closed surrounding the hot zone. A minimum number of openings may be left through the sides and ends of the heat shield assembly to provide for holding or manipulating specimens within the hot zone, temperature sensing, the provision of power to heating elements, and other purposes. It should be understood that the term "non-oxidizing atmosphere" used herein should be interpreted relative to the characteristics of the heat shield material, and it means an atmosphere that is not so oxidizing to the heat shield material as to make the heat shield material economically undesirable in the application.

Turning now to the drawings, FIG. 1 shows one half of a heat shield assembly of the invention in place within an opened vacuum furnace indicated at 1. A vacuum port is provided in the shell at 2 for suitable connections to a vacuum pumping system not shown. Pull-rods 3 and 4 are adapted to connect the specimen 9 in the hot zone of the furnace to a tensile testing machine, not shown. The pull-rods 3 and 4 enter the vacuum furnace through sealing glands 5 and 6 provided with O-ring seals and are connected to the specimen 9 by any suitable means such as female double-screw-threaded adapters 7 and 8. Although in some instances the specimen 9 could be heated by self-resistance with the electrical power being provided through the pull-rods, it is generally preferable to use an external heater such as that shown at 10 within the heat shield to provide heat to the specimen 9. Suitable water-cooled electrical inleads can be provided as at 10a and 10b. A multi-layered heat shield of the invention is shown at 11 and comprises a vertical semi-circular section 23 and two end sections 24 and 25. Each end is provided with an access hole for the pull-rods, and the lower end in this instance is illustrated as having entry ports 12 and 13 for the electric inleads 10a, 10b to the heating element.

The heat shield assembly is situated within a holder 14 which may be water-cooled. The holder 14 has two flanges 15 and 16 to permit attachment to the inner wall of the vacuum chamber by any suitable means, not shown. Similarly, the opposite half of the holder has the same flange arrangement. The two holder halves are so constructed as to meet, with a minimum gap, when the chamber door is closed. The furnace casing is provided with two flanges shown at 17, one of which can be used as a hinge. In order to assure a satisfactory vacuum seal, the face of the furnace at 18 can be provided with a continuous rubber or other type of sealing gasket.

FIG. 2 shows a key element or member of the heat shield assembly in perspective at 19. The undulating wire spot-welded to the outer face of the heat shield to provide separation between the members of the heat shield is shown at 20. A flange 21 provides visual and mechanical access through the heat shield into the hot zone, and is useful for optical pyrometry and to allow extensometers to be attached to a tensile specimen, as well as for other purposes. The flange 21 is supported by a flange plate 22 also spot-welded to the member 19. The flange 21 and flange plate 22 could be used in one or both halves of the heat shield, or they could be eliminated altogether in applications where they are not necessary.

FIG. 3 shows one half of a heat shield assembly of the invention assembled and another half spread out to show its elements. The assembled half rests within a holder or casing 14 which has two flanges 15 and 16 adapted to fasten the assembled half to the inner chamber wall. The heat shield assembly is identical to that described in connection with FIG. 1 and comprises a top section 24, a bottom section 25 and a cylindrical body section 23. The body section has a flange 21 welded to a flange plate 22 and extending outwardly from the innermost member of the assembly through the balance of the assembly. The flange communicates with a hole, not shown, of similar size, shape and location through the holder 14. As seen in elements 30 through 34, each member of the heat shield is identical except that they vary in size to allow nesting, and the innermost member is provided with a flange 21 that serves to key the cylindrical members together in this embodiment of the invention. Each of the members has a flange plate 22 surrounding the hole to support the edges of the hole through which the flange 21 extends. This arrangement of a flange 21 extending through holes in each of the other members of the body of the heat shield can be constructed loosely enough to avoid any deleterious thermal stresses being transmitted from one member to another, and provides for ready assembly and partial or complete disassembly of the heat shield, even when one member of the heat shield has been damaged and needs to be replaced individually. The top members of the heat shield are shown at 35 through 39, and the bottom elements are shown at 40 through 44. Spacer wires are attached to each member of the heat shield as shown at 20 in a pattern appropriate to assure efficient spacing of the shield elements one from another. The wire has some portions resting against the member and other portions raised a generally uniform distance from the member and spaced about the surface of the member with sufficient periodicity to provide support to prevent another member from coming into direct thermally conductive contact with the member to which the wire is affixed during the use of the heat shield in a furnace.

FIG. 4 shows schematically the manner in which four members of a heat shield of the invention are held apart one from another by undulating wire spacers 46 welded to the heat shield members 45 at points 47 along the member.

Although the invention has been described in relation to a split heat shield assembly that can be opened from the side, it will be readily apparent to those skilled in the art that the invention is also applicable to non-split cylindrical heat shields to heat shields having other geometries.

The undulating wire spacers for use in heat shields of the invention provide small individual contacts thereby decreasing heat loss by conduction and at the same time maintaining the shape of each member of the heat shield by giving the heat shield assembly a strongly self-supporting but spring-like construction. The wire spacers do not necessarily have to be of the same material as the shield members. Refractory metals such as tungsten, molybdeum, tantalum or columbium or many of their alloys can be used for construction of heat shield assemblies and for the wire spacers dependent upon the design temperature of the furnace in which it is to be used. Because of the undulating wire design, expansion characteristics of the wire and the sheet are of lesser importance than otherwise. The innermost or key member of the heat shield assembly can be constructed so as to retain in position the successive outer members without pinning or permanent attachment, or a few loops of wire can be loosely stitched through the assembly at points spaced apart, thereby allowing ready disassembly and part replacement. However, the invention does not require such a construction, and is broad enough to include any high temperature heat shielding of the type described which utilizes the spacing apart of a multi-layered construction by a corrugated, crimped, scalloped, undulating, or other type of wire having raised portions as described and attached to surfaces of members of the heat shield assembly with sufficient periodicity to prevent warpage from causing contact of the members one to another.

It is intended that this invention be interpreted as broadly as the true scope and spirit of the appended claims.

What we claim as new and desire to secure by Letters Patent of the United States is:

1. A mutli-layered heat shield assembly for a vacuum or non-oxidizing atmosphere type furnace comprising a plurality of metal sheet members adapted to substantially enclose a hot zone of said furnace, said members being arranged in multi-layered fashion so that outwardly directed thermal radiation from the hot zone is reflected back into the hot zone by the innermost member of said heat shield and so that outwardly successive members reflect back towards the hot zone thermal radiation from the next innermost member, said members being removably located adjacent one another, said members having affixed to at least some of their surfaces undulating wire in a manner to hold said members apart and prevent warpage of such a degree as to allow members to touch one another, and minimize conductive heat transfer through said heat shield.

2. A heat shield of claim 1 in which the undulating wire is welded to the outer side of each member.

3. A metal sheet member suitable for use in a heat shield of claim 1, said member having welded to at least one side wire which has some portions resting against said member and other portions raised a generally uniform distance from said member, said raised portions being spaced about the surface of said member with sufficient periodicity to provide support to prevent another similar member from coming into direct thermally conductive contact with said member through warpage of the member or otherwise during the use of the heat shield in a furnace.

References Cited by the Examiner

UNITED STATES PATENTS

| 2,887,154 | 5/1959 | Morningstar et al. | 126—202 X |
| 3,128,756 | 5/1964 | Galvin | 126—118 X |
| 3,170,018 | 2/1965 | Lewis | 262—40 X |

FREDERICK L. MATTESON, JR., *Primary Examiner.*

JOHN J. CAMBY, *Examiner.*